Figure 1:
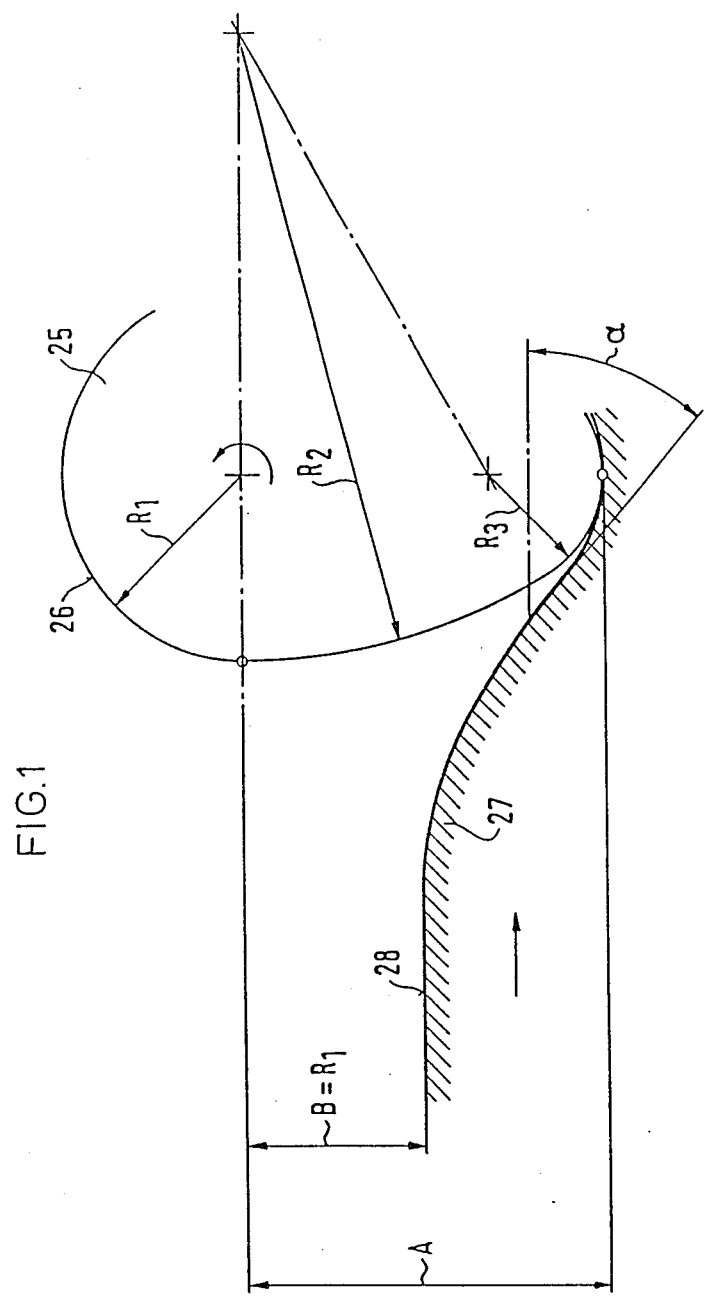

United States Patent [19]

Furch et al.

[11] Patent Number: 4,763,385

[45] Date of Patent: Aug. 16, 1988

[54] DOOR CLOSURE TRANSMISSION UTILIZING AN ECCENTRIC PINION

[75] Inventors: Gerhard Furch, Sindelfingen; Georg Scheck, Tiefenbronn; Fritz Feucht, Renningen; Ralf Storandt, Leonberg, all of Fed. Rep. of Germany

[73] Assignee: GEZE GmbH, Fed. Rep. of Germany

[21] Appl. No.: 42,381

[22] Filed: Apr. 24, 1987

[30] Foreign Application Priority Data

Apr. 28, 1986 [EP] European Pat. Off. ......... 86105855.0
Nov. 10, 1986 [DE] Fed. Rep. of Germany ....... 3638353

[51] Int. Cl.[4] ............................................. E05F 3/22
[52] U.S. Cl. .......................................... 16/58; 16/62; 16/64; 16/DIG. 10
[58] Field of Search ............ 16/52, 58, 62, 64, 69, 16/79, DIG. 9, DIG. 10

[56] References Cited

U.S. PATENT DOCUMENTS

| 1,253,369 | 1/1918 | Gair | 16/62 |
| 1,711,626 | 5/1929 | Webster | 16/62 |
| 3,220,047 | 11/1965 | Flint | 16/62 |
| 3,337,902 | 8/1967 | Webb et al. | 16/62 |

FOREIGN PATENT DOCUMENTS

| 0056256 | 7/1982 | European Pat. Off. | 16/52 |
| 3234319 | 3/1984 | Fed. Rep. of Germany | 16/52 |
| 1332480 | 10/1973 | United Kingdom | 16/58 |

Primary Examiner—Fred A. Silverberg

[57] ABSTRACT

A door closer is described in which transmission ratios which change in dependence on the closing angle can be realized by eccentric toothed elements. The toothed elements can have different profile offsets, moduli and flank angles along their respective pitch curves.

16 Claims, 7 Drawing Sheets

DOOR CLOSURE TRANSMISSION UTILIZING AN ECCENTRIC PINION

The invention relates to a door closer having a piston guided in a housing, at least one closer spring which coacts with the piston, a hydraulic damping device, and a closer shaft or axle connected to the pinion via a transmission.

A closer of this kind is known from German Gebrauchsmuster No. 17 95 135.

This known closer is constructed so that the torque acting on the closer shaft has its maximum in the zero position, rapidly reduces in the range of small angles of opening, then remains approximately constant and finally sinks gradually to zero at an opening angle of 180°. This is achieved by guiding the closing spring on a hollow cylinder which is fixedly arranged in the closer housing. Respective slide members which serve as abutments are displaceable in slots at the ends of the hollow cylinder. The slide member adjacent the closer axle contacts a cam disk sitting on the closer axle by means of a roller. The other slide member is connected by a link with a crank which is journalled in the end of the housing opposite to the closer axle and is connected with the closer axle in force transmitting manner via a chain drive.

This known apparatus is, on the one hand, extremely complicated and expensive and offers, on the other hand, restricted possibilities with regard to presetting a specific closing force characteristic.

Great attention must in practice be devoted to the transmission ratio of a particular closer, i.e. to the instantaneous ratio of the angular speed of the closer axle to the angular speed of the door, especially when particular requirements are placed on the closer, be it an overhead closer or a floor-mounted door closer.

This is for example the case with so-called slide arm closers in whch the closing moments are unfavorable because only a comparatively small moment is available at small opening angles when the door has to be pressed into the lock. Although the frictional conditions at the moment of opening the door leaf are favorable for slide arm closers which are characterized by an optically favorable appearance, because little friction arises at low angles of opening, relatively long guide rails must nevertheless be provided in order to ensure the required functional reliability.

It is the object underlying the invention to provide a door closer which can be used both as an overhead door closer and also as a floor-mounted door closer, and in particular as a slide arm closer, which satisfies both the requirements for a compact type of construction and economical manufacture, and also the requirement for ideal closing and opening moments, and which, for slide arm closers, accordingly permits the use of short guide rails having dimensions corresponding approximately to the dimensions of the closer itself.

This object is satisfied in that the transmission has at least one pinion gear which is eccentrically mounted and/or has differently shaped teeth at its periphery. In the event of eccentric mounting the pinion gear can have a circular or non-circular pitch curve. For eccentrically mounted pinions and also centrally mounted pinions the pinion teeth can have teeth of different shape around the periphery of the pinion, i.e. around the pitch curve. By way of example the profile offset, modulus and/or flank angle can be varied. In so doing the pinion gear engages with a complementary gear tooth arrangement which is associated with the piston, at least in force-transmitting manner.

The closing moment can be transmitted to the door by the closer shaft itself, or via a gearwheel which is rotatably mounted on the closer axle. The same applies to the opening moment which is to be transferred on opening the door from the door to the closer shaft, or to the gearwheel mounted on the closer axle. Both the eccentric mounting of the pinion gear and also the varying layout of the teeth provide the possibility of being able to select a changing transfer function, i.e. a changing transmission ratio in dependence on the closing angle. In this way an ideal variation of the overall closing moment and also of the opening moment can be selected and a high degree of efficiency of the closer is achieved with a compact construction.

The shape of the pitch curve is correspondingly selected. The pitch curve of the eccentrically mounted pinion gear is preferably so formed that it merges, starting from a region with a minimum radius, continuously into a region with maximum radius. By way of example the pitch curve can consist of several circular sections which merge directly into one another with the radii of the circular sections being different and with their centers being displaced relative to one another. In such an arrangement provision can be made that the first pitch curve section which is associated with large opening angles of the closer is followed by a second pitch curve section with a substantially larger radius ($R_2$) which continuously extends the first pitch curve section, and that a third pitch curve section continuously adjoins the second pitch curve section with the radius ($R_3$) of the third pitch curve section being smaller than the radius ($R_1$) of the first pitch curve section and being associated with the range of small angles of opening of the door closer. A corresponding pitch curve results for the complementary gear tooth arrangement associated with the toothed pinion, for example an elongate S-shaped pitch curve.

It is advantageous, in particular with this embodiment, when the pinion gear and/or the complementary gear tooth arrangement associated with the pinion gear has or have differently shaped teeth on different sections of the pitch curve, with the shape of the teeth being varied in particular in dependence on the door opening angles associated with the pitch curve sections and/or in dependence on the respectively effective lever arm.

By way of example the pinion gear teeth and/or the complementary teeth associated with the pinion gear can have a profile offset which varies along the respective pitch curve. The profile offset is advantageously made positive for the pinion side teeth in a pitch curve section associated with a large door opening angle. This signifies that the teeth of the pinion are displaced radially outwardly. In the relevant region of large door opening angles the radius of the pinion is relatively small. The positive profile offset provides the possibility, even taking account of the small radius, of using a closer shaft with a relatively large diameter to mount the pinion.

The complementary teeth associated with the pinion gear can have a corresponding but opposite profile offset to the pinion teeth.

Provision is made in a preferred further development for the profile offset of the pinion teeth to be negative in a pitch curve section associated with a small angle of door opening. When the complementary piston side tooth arrangement, which is preferably formed as a toothed bar or rack, has a corresponding but opposite profile offset to the pinion teeth then the piston side teeth have a positive profile offset in the region of small opening angles, with the consequence that the wall in this region is reduced relatively little by the teeth, and the piston can thus be executed with a small diameter.

The profile offset for the pinion teeth preferably increases continuously in the direction of positive profile offset with an increasing angle of door opening.

In further preferred embodiments provision is made for the pinion teeth and/or the complementary teeth associated with the pinion to have a varying modulus along the associated pitch curve. This signifies that differently sized teeth are provided along the pitch curve sections. In this way the strength of the teeth can be selected as desired in the individual pitch curve sections. The modulus or the tooth size is preferably only selected to be as large as is necessary for the required strength.

In order to have approximately the same strength over all the teeth provision is made for the modulus to change in inverse proportion to the effective lever arm.

The modulus preferably continuously increases with the associated angle of door opening.

In special embodiments provision is made for the teeth to have relatively small modulus in sections of the pitch curve associated with a small angle of door opening and for them to have larger modulus in sections of the pitch curve associated with large angles of door opening. In this way relatively small teeth are present in the region of small angles of opening and larger teeth are provided in the region of larger angles of opening. This applies to the teeth of the pinion gear in the same way as the piston-side gear tooth arrangement which is preferably executed as a piston rod. With this arrangement the complementary piston-side teeth can have moduli which vary in correspondence with the pinion-side teeth.

Provision is made in particularly preferred embodiments for the pinion teeth and/or the complementary teeth associated with the pinion to have at least one tooth with different flank angles. Several such teeth are preferably provided, in particular in the region of relatively large angles of engagement in order to reduce the wall friction. The engagement angle corresponds for example to the slope angle of the pitch curve of the toothed rack. This embodiment of the teeth is of advantage in the so-called transition region of the toothed rack, i.e. in the region of the inflection point of the S-shaped pitch curve and in the complementary region of the pinion teeth. These are asymmetric teeth in which the pressure side flank has a more acute flank angle than a non-pressure side flank. This means that the force components in the direction of the sidewall, and thus also the wall friction, are kept relatively small.

The complementary teeth associated with the pinion can have corresponding flank angles to the pinion teeth.

It has proved to be of particular advantage when the shape of the pinion teeth and/or the complementary teeth associated with the pinion is optimised by appropriate adjustment of the profile offset, modulus and/or flank angle, in particular by computer-aided design. The features of profile offset, modulus and flank angle can be varied over sections of the pitch curve, and can in particular be matched to one another, they can however also be held constant over the entire pitch curve.

In a particular embodiment provision is made for the eccentrically journalled pinion to cooperate with a transmission which corresponds to the transmission of a customary door closer. This provides the possibility of using components of a customary closer, or of appropriately converting a customary closer.

Particular cost advantages result in manufacturing a corresponding embodiment in which a customary door closer is used together with its housing and with the mechanism including the transmission which is located therein, and in which two eccentrically mounted meshing pinions are arranged outside of the housing, of which the one is mounted on the closer shaft of the customary door closer and the other is mounted on a further shaft or axle mounted in the housing in order to transfer the closing moment to the door. As the eccentric transmission is arranged outside of the housing the eccentrically mounted gears can be relatively large and executed as thin disks. They can be manufactured as inexpensive stamped parts. The eccentrically mounted pinion advantageously has a non-round, in particular an oval or elliptical pitch curve, can however also be constructed as a circular eccentrically mounted pinion.

Further advantageous embodiments of the invention are set forth in the subordinate claims.

Figure 2:
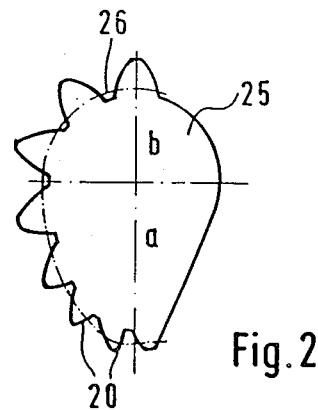
Figure 3:
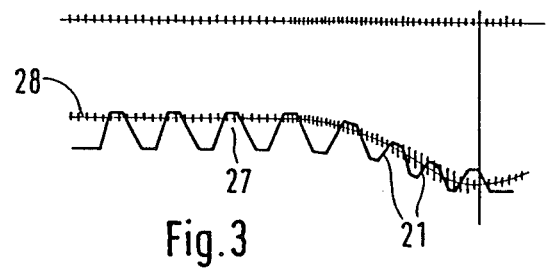
Figure 4:
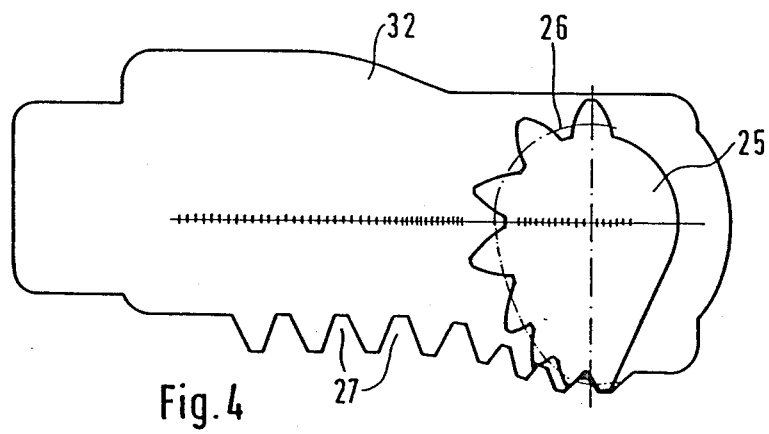
Figure 5:
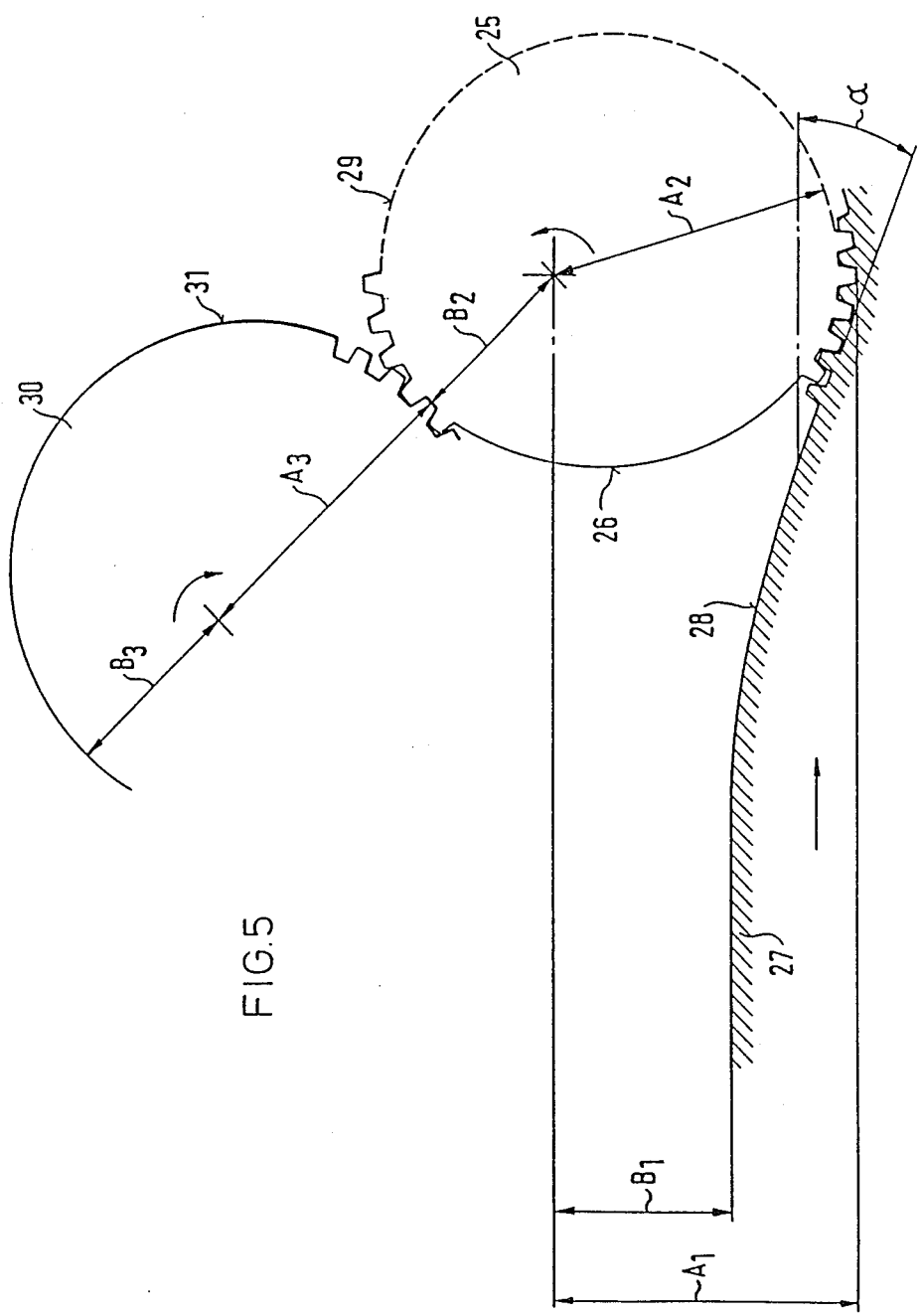
Figure 6:
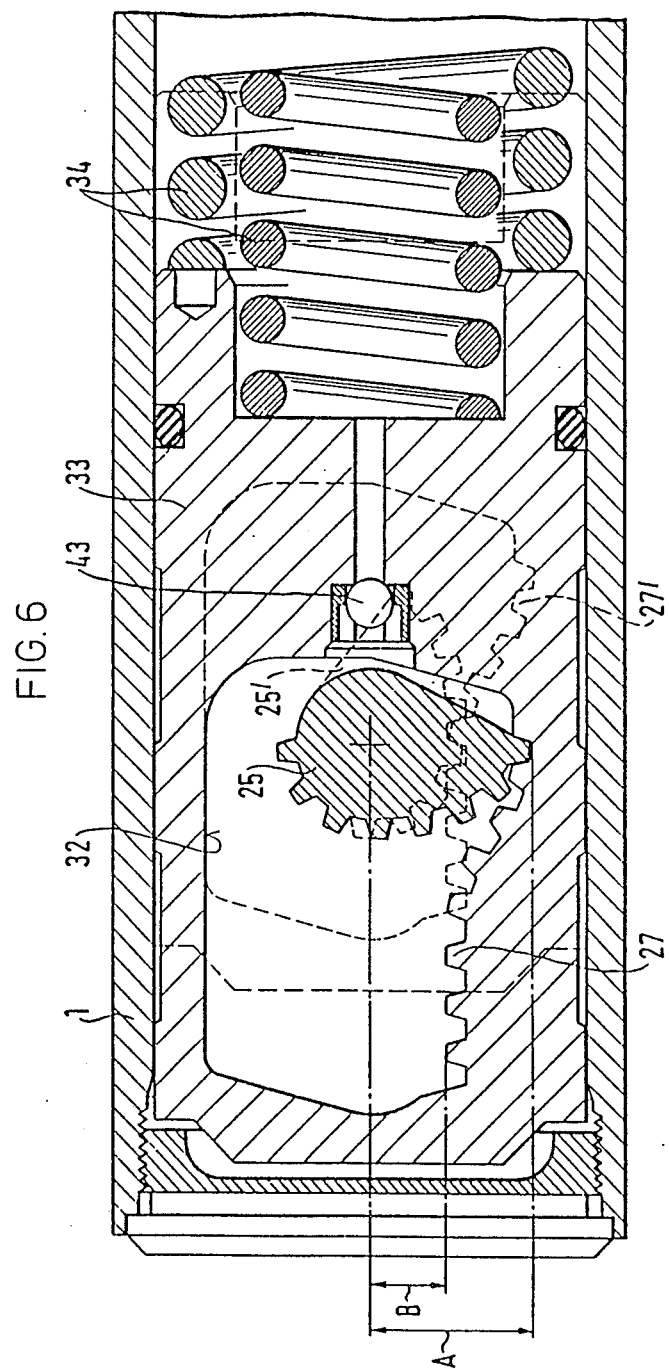
Figure 7:
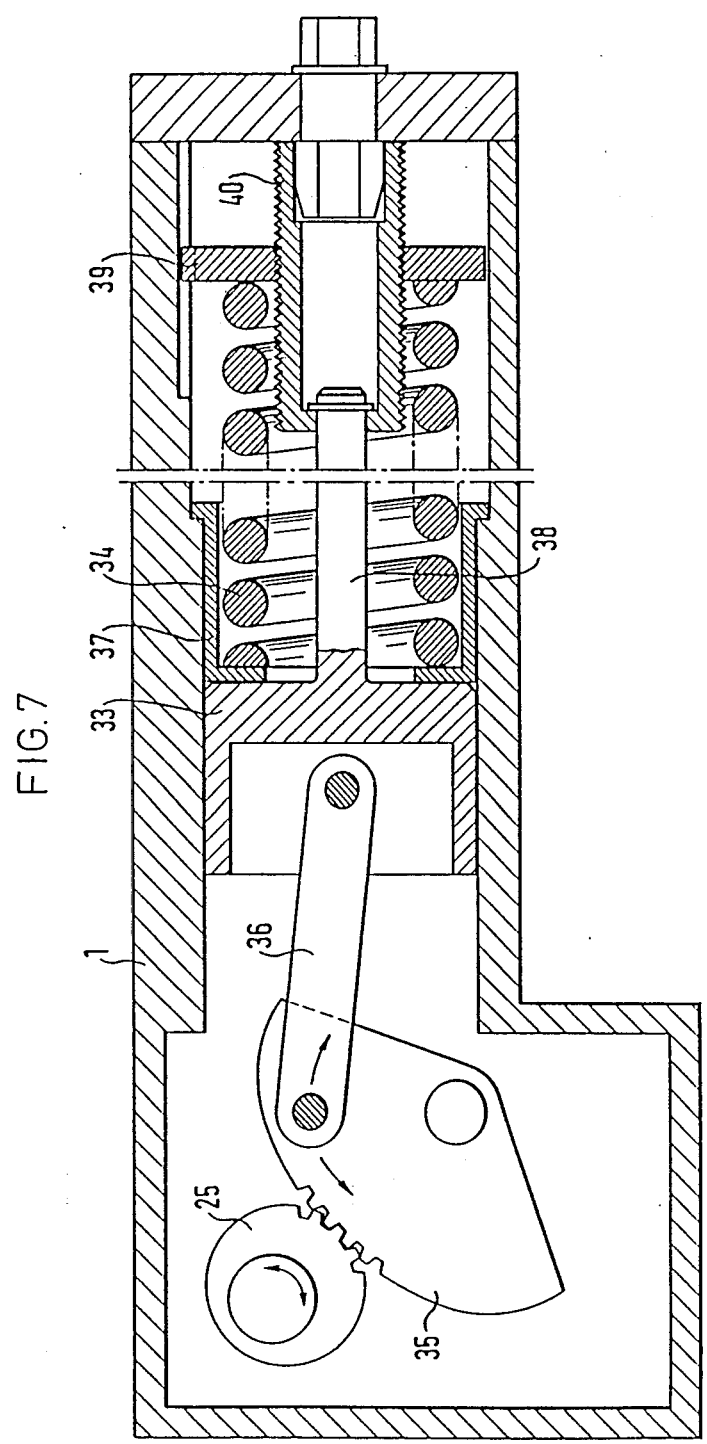
Figure 8:
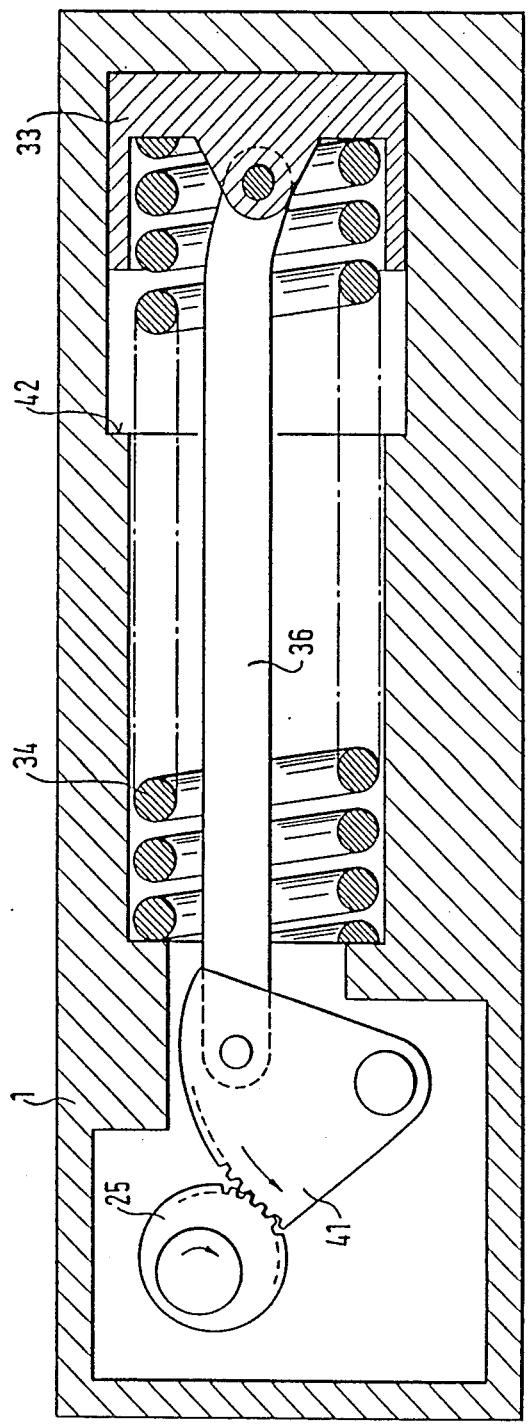
Figure 9:
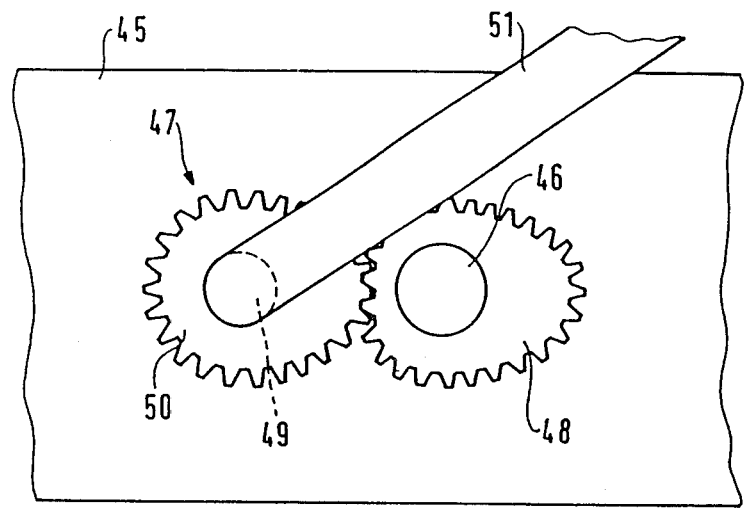
Figure 10:
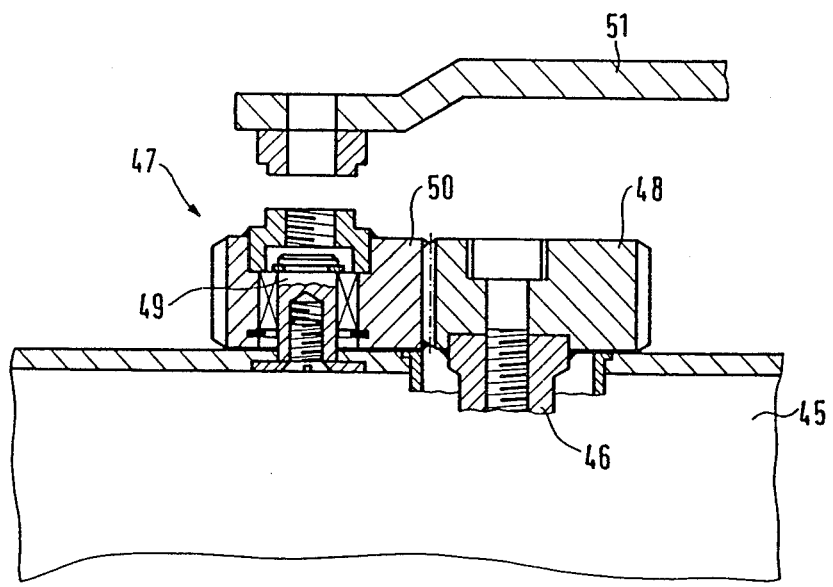

The invention will now be described in more detail in the following with reference to embodiments in conjunction with the drawings in which are shown:

FIG. 1 a schematic illustration to explain the operating principle of a door closer operating with an eccentric toothed gear, FIG. 2 a schematic illustration of an embodiment of an eccentrically journalled toothed gear, FIG. 3 a schematic representation of an embodiment of a toothed gear arrangement associated with the pinion of FIG. 2, FIG. 4 a schematic representation of an embodiment of a piston with an internal toothed gear arrangement in accordance with FIG. 3 and an associated pinion in accordance with FIG. 2, FIG. 5 a schematic illustration to explain a variant with a high transmission ratio which is in particular suitable for floor-mounted door closers, FIG. 6 a schematic part-sectional representation of an embodiment of an overhead door closer, FIG. 7 a schematic part-sectional representation of a floor-mounted door closer constructed in accordance with the invention for swing doors, FIG. 8 a schematic part-sectional representation of a floor-mounted door closer constructed in accordance with the invention for rabbeted doors, FIG. 9 a schematic plan view representation of a variant which utilises a customary door closer and an additional eccentric transmission, and FIG. 10 a schematic sideview of the variant of FIG. 9.

FIG. 1 shows in schematic manner a pinion gear 25 for connection to a closer shaft, with the pinion gear 25 meshing with a toothed gear arrangement 27 fixed relative to the piston.

The piston, which is not represented in this embodiment in further detail, can cooperate in the customary manner with a closer spring mounted in a housing. Embodiments are envisaged as overhead door closers and as floor-mounted door closers. In the case of an overhead door closer the pinion gear 25 or the closer shaft carrying the pinion gear is connected with a linkage provided for force transmission between the door and the frame. The linkage is preferably constructed as a slide arm.

The toothed pinion 25 has a pitch curve 26 which consists of a first circular section with the radius R1, a circular section with the radius R2 which smoothly adjoins the first circular section with the radius R1, and a third circular section with the radius R3 which again smoothly adjoins the second circular section with the radius R2. The central pitch curve section with the radius R2 has the smallest curvature, i.e. the radius R2 is substantially larger than the radii R1 and R3.

The pitch curve section with the smallest radius R3 engages, in the illustrated schematic representation, with the toothed gear arrangement 27 with the illustrated position corresponding to the opening angle 0° of the door closer, i.e. the associated door is closed. If the door is opened then the spring force of the closing spring acting on the piston, and thus on the toothed rack carrying the gear tooth arrangement 27, acts via the lever arm A, i.e. a high closing force is available in the region of small opening angles.

On further opening the door, i.e. on increasing the angle of opening the pinion gear 25 rotates counter-clockwise and the toothed gear arrangement 27 fixed to the piston is displaced to the right in the representation of FIG. 1 against the spring force of the closing spring. In so doing the effective lever arm reduces in correspondence with the selected course of the pitch curve and indeed to the value B which corresponds to the radius R1 of the pitch curve 26 of the pinion gear 25. In the illustrated embodiment of FIG. 1 the ratio of A to B is equal to 2 to 1. This ratio corresponds to the transmission ratio which is achieved.

By suitable choice of the shape of the pitch curve 26, which need not necessarily be composed of circular segments, it is possible to achieve a very flat course of the pitch curve for the toothed gear arrangement 27, with the flat course corresponding to a small angle of engagement or pressure angle, so that the frictional component acting on the guide wall for the toothed gear arrangement 27 is also minimized.

The maximum angle of engagement in an embodiment in accordance with FIG. 1 is designated by $\alpha$.

The FIGS. 2 and 3 show embodiments of a toothed gear 25 and an associated piston side toothed gear arrangement 27. FIG. 4 shows in this respect an embodiment in which the pinion 25 engages in the toothed gear arrangement 27, with the piston side toothed gear arrangement 27 being formed as an internal toothed arrangement in a hollow chamber 32 of the piston. The pinion 25 is mounted on the closer shaft which projects into the hollow chamber 32.

The pinion 25 only has teeth on a section of its periphery with which it meshes with the piston-side toothed gear arrangement 27. The teeth of the pinion 25 extend over a pitch curve segment from 0° to 180°. In the representation in FIGS. 2 and 3 the pitch curves 26, 27 are drawn into the toothed arrangements 25, 27 with a scale which shows for the various positions of engagement the respective angle of rotation of the pinion 25 and of the associated angle of opening of the door.

In the embodiment in FIG. 4 the arrangement of the pinion 25 and of the associated piston side toothed gear arrangement and also their pitch curves 26, 28 follow the scheme of FIG. 1. In the position shown in FIG. 4 the pinion 25 is in the rotational position 0°. The longer lever arm a is effective. The door is closed. On opening the door the pinion 25 rotates counter-clockwise and comes into the rotational position of 180° when the door is open to its maximum value. In this position the shorter lever arm b is effective.

The toothed portion of the pinion 25 and the toothed gear arrangement 27 fixed to the piston are formed as involute gear teeth. This has advantages from the technical manufacturing viewpoint. Other tooth types are however entirely possible for other embodiments.

The teeth of the pinion 25 have profile offset, or profile correction which varies over the periphery of the pinion 25 between 0° and 180°. It is negative in the region of small angles, in particular around 0° and positive in the region of larger angles, and indeed from approximately 30° onwards and notably more positive from 80° to 180°. The profile offset increases continuously with the angle of rotation of the pinion 25 from the negative values to the positive values.

The piston side teeth 27 have a corresponding but opposite profile offset. Consequently positive values are provided in the regions associated with small angles of door opening and negative values are provided in the region of larger opening angles.

The positive profile offset present in the teeth of the pinion 25 in the region of larger angles makes it possible to use a closer shaft with a relatively large diameter to mount the pinion 25 despite the relatively short radius b. On the other hand the positive profile offset present in the piston-side teeth 27 at the associated small angles ensures that the wall thickness of the piston side teeth 27 in this region is only weakened to a relatively small degree by the teeth even with large transmission ratios and steep angles of attack. This means that the wall thickness is not too thin even with the desired relatively narrow construction. This signifies that for relatively large transmission ratios a relatively slender piston can be used.

Furthermore, the teeth of the pinion 25 have a modulus which varies over the pitch curve section from 0° to 180°. The same applies to the piston side teeth 27.

The modulus continuously increases with the associated door opening angle, and indeed inversely proportional to the respective radius of the pinion 25 or to the lever arm effective at any particular time. This signifies that in the region of small angles of opening (around 0°) relatively small modulii, i.e. small teeth, are provided at the same time as a relatively large lever arm (around a) and that in the region of larger angles larger moduli, i.e. bigger teeth are provided at the same time as a smaller lever arm (around b).

The associated, complementary, piston-side teeth 27 have a corresponding variation in modulus in that relatively small moduli are provided in the region of small angles of opening and larger moduli are provided in the region of larger angles of opening.

The modulus is so selected that the teeth 25, 27 are laid out over the entire region with approximately the same strength. Furthermore a particularly fluid course of the rolling process is achieved for small moduli because of the lower flank friction that occurs with small moduli. Although relatively large moduli are provided in the region of larger angles the simultaneous provision of positive profile offset in the pinion 25 avoids the disadvantageous undercut which would otherwise occur with large moduli and small radius.

The teeth of the pinion 25 and the piston side teeth 27 moreover have specially adjusted flank angles. As can in particular be seen from FIGS. 2 to 4 the teeth in the region of small angles of door opening are in particular asymmetrically shaped in that the pressure side flanks—the right flanks 20 of the pinion 25 and the left flanks 21 of the piston side teeth 27 as seen in the drawing—extend steeper relative to the normal to the pitch curve in the region of the flanks.

This ensures that the force components in the direction towards the piston wall are reduced and consequently that the wall friction is also kept small. This results in good operational efficiency.

In the embodiment of FIG. 4 the flanks 20, 21 of the teeth represent in each case the pressure side and indeed both during opening and also during closing. The steeper layout of these flanks means that all friction is in each case reduced both during opening and also during closing.

The reduction of friction is in particular important during opening because then the friction and the spring force operate in the same direction, and indeed against the opening movement; other than the case on closing the door, when friction and spring force operate against one another. Consequently the opening movement which has to be supplied is in each case larger than the closing moment.

In the DIN Regulations for door closers there is a requirement that the opening moment may not be more than 1.5 times the closing moment. This can readily be achieved with the layout of the flank angles in accordance with the invention.

The schematic illustration of principle of FIG. 5 shows an arrangement which is particularly suited for floor-mounted door closers. In this arrangement an eccentric toothed gear or opinion 30 is connected to the closer axle and meshes with a further rotatably journalled eccentric pinion 25. This pinion 25 engages in turn with gear 27, which is in particular executed as a toothed bar or rack and is fixedly connected to the piston. The pitch curve 31 of the eccentric pinion 30 extends relative to the axis of rotation such that the lever arms which are effective relative to the pinion 25 change from the maximum value $A_3$ to the minimum value $B_3$ over the full angle of opening of the closer.

The pitch curve 29 of the pinion 25 is associated with the pitch curve 31 of the pinion 30. The pitch curve 29 is shown in broken lines and extends over approximately half the periphery of the pinion 25. The other half of the periphery of the pinion 25 has a pitch curve 26 which cooperates with the teeth 27 which have the very flat pitch curve 28.

The minimum radius of the pinion 25 which becomes active is designated with $B_2$ and the maximum radius which becomes active is characterised by $A_2$.

The transmission ratios which come into effect due to the cooperation of the pinion 25 and the teeth 27 are designated by $A_1$ and $B_1$.

When using this embodiment a particularly favourable k dimension of for example 20 mm is achieved and for floor-mounted door closers it is important that despite the very flat pitch curve 28 of the teeth 27 a very high transmission ratio can be achieved. The transmission ratio results from the product of the individual transmission ratios, i.e. in the present case from the product $(A_3/B_3)$, $(A_2/B_2)$ and $(A_1/B_1)$, respectively. A ratio of for example 4.5 to 1 can be achieved in practice without problem.

It should also be mentioned that the engagement regions of the pinion 25, i.e. the regions 26, 29 which have been termed pitch curves above can also overlap. The teeth in FIG. 5 can also be formed in corresponding manner to the teeth of FIGS. 2 to 4 with variation of the profile offset, of the modulus and/or of the flank angle.

FIG. 6 shows a part-sectional representation of an overhead door closer constructed in accordance with the invention.

A piston 33 which is biased in the customary manner into the closed position by means of compression springs 34 is arranged in the housing 1. The piston 33 has in its region remote from the springs 34 a cut-out or hollow chamber 32 in which an eccentric pinion 25 is arranged which is rotationally fixedly connected to the closer shaft. This toothed gear 25 engages with teeth 27, the pitch curve of which has been matched to the corresponding pitch curve of the pinion 25. A non-return valve 43 belonging to the damping device is provided in the region of the piston cut-out 32 at the spring side.

The position of the piston 33 showing in solid lines corresponds to the closed position. In this position the largest lever arm A is effective between the eccentric toothed gear 25 and the teeth 27. If the door leaf associated with the closer is pivoted in the opening direction then the piston 33 moves as a result of the cooperation of the toothed gear 25 and the teeth 27 into the position shown in broken lines with the lever arm becoming continuously smaller and finally reaching the smallest value b in the position of the pinion and rack identified by 25' and 27' respectively.

In this embodiment the shallow course of the teeth 27 should be noted which ensures that the frictional components between the piston 33 and the housing 1 remain minimal.

FIG. 7 shows an embodiment of the invention in the form of a floor-mounted door closer for swing doors. In this arrangement the eccentric pinion 25 is arranged in a corner region of the housing, in order to achieve an assembly which is as compact as possible, and engages with a centrally symmetrical, toothed segment 35. This toothed segment 35 is pivotally mounted at the center and connects with the piston 33 via a lever or link 36. The lever 36 is pivotally mounted at both ends.

The piston 33 is provided with a rod 38 which carries an axially adjustable support and guide disk 39 at its end region. A compression spring 34 is arranged between this support and guide disk 39 and an abutment sleeve 37 which directly adjoins the piston 33 in the central position. This compression spring 34 is loaded in dependence on the direction of the swing movement of the associated swing door, and indeed, on the one hand, via the support and guide disk 39 when the abutment sleeve 37 is supported on the step in the housing, and, on the other hand, by the abutment sleeve 37 when the support and guide disk 39 is supported. The support and guide disk is secured to an adjustable sleeve 40 which, on the one hand, displaceably receives the piston rod 38 and, on the other hand, can be adjusted in the axial direction from outside of the housing.

The plot of the closing force relative to the angle of opening of the door can again be ideally preselected by special selection of the pitch curves of the eccentric toothed gear 25 and of the toothed segment 35.

FIG. 8 shows an embodiment of the invention in the form of a floor-mounted door closer for rabetted doors.

In this embodiment the eccentric pinion 25 is again preferably arranged in the corner region of the housing and cooperates with an eccentric segment 41 which is pivotably mounted and coupled with the piston 33 via a connecting rod 36. The pot-like piston 33 is biased by means of a spring 34 in the direction towards the end of the housing 1 and is movable between this end of the housing and a housing abutment 42.

The eccentricities or pitch curves of the pinion 25 and of the toothed segment 21 can again be selected in accordance with the desired plot or characteristic of the closing force.

The variant shown in FIGS. 9 and 10 represents a modification of a customary door closer in accordance with the invention. Use is preferably made of a customary overhead door closer. It has a housing 45 with a closer shaft 46 journalled therein and a toothed gear or pinion which is not shown but which is centrally mounted on the closer shaft 46 inside the housing 45, and this pinion meshes with teeth provided on the piston (likewise not shown) within the housing 45.

The door closer as hitherto described is of customary construction and it is provided with an additional oval gear transmission 47 which is executed in the embodiment as elliptical gearing. More specifically, an eccentrically mounted gearwheel 48 is mounted on an end of the closer shaft 46 which projects out of the housing 45 and meshes with a further gearwheel 50 which is likewise journalled on the housing on an additional axle 49. The gearwheel 50 is connected with a link which in the present case is formed as a slide arm 51. The axle 49 can alternatively be constructed as a shaft connected to the slide arm 51 which then also represents the closer shaft of the door closer of the invention.

The gearwheels 48, 50 are executed as ellipsoidal gearwheels and can be dimensioned as required as relatively thin disks with relatively large radii, since they are arranged outside of the housing 45 and are thus not restricted by the dimensions of the inner space. The gearwheels 48, 50 can also be manufactured as inexpensive stamped parts. The transmission or gearing 47 formed by the gearwheels 48, 50 brings the desired transmission ratio and ensures a favourable torque plot even when using a sliding arm. Furthermore, the desirable construction of the customary closer is retained. The eccentrically mounted toothed gear can basically have a pitch curve shape such as is shown in FIGS. 1 to 5 and the entire additional gear transmission can be constructed in accordance with the embodiments in FIGS. 1 to 5.

All embodiments of the invention have the common feature that a technically simple construction results which is economical to realise with the eccentric elements likewise being economical to manufacture, since for each special element it is only necessary to make just once a corresponding broaching tool or a corresponding die.

The compactness of the particular closer which can always be obtained is, in all embodiments, paired with an ideal plot for the total closing moment, which can be adapted in the best possible manner to the particular application.

It will be understood by those skilled in the art that the term "modulus" is a term used in central Europe in place of the term "diametral pitch" used in Anglosaxon countries. The relationship between modulus m in mm and diametral pitch P in 1/inch is given by $m=(25\times 4)/p$.

We claim:

1. A door closer comprising a housing; a bore in said housing; a piston guided in said bore for linear movement therein; spring means disposed in said bore for resiliently biasing said piston into an end position, said piston having first and second opposite ends with said first end coacting with said spring means; a closer axle; an eccentric toothed pinion disposed in said housing and drivingly connected to said closer axle; said eccentric toothed pinion having a first pitch curve and a plurality of pinioned teeth disposed along said first pitch curve; a toothed rack formed on said piston between said first and second opposite ends and meshing with said eccentric toothed pinion, said toothed rack having a second pitch curve matched to said first pitch curve and having a plurality of rack teeth disposed along said second pitch curve; wherein said eccentric toothed pinion and said toothed rack cooperate to provide a lever arm of variable length, said lower arm having a maxmimum value in a first relative position of said eccentric toothed pinion and said toothed rack corresponding to a door closed position and reducing from said maximum value to a minimum value in a second relative position of said eccentric toothed pinion and said toothed rack corresponding to a door open position; wherein said pinion teeth have a profile offset which varies along said pitch curve and has a positive value for teeth which engage said rack teeth when said lever arm has said minimum value, and wherein said rack teeth have a corresponding but opposite profile offset such that rack teeth which engage with said pinion teeth when said lever arm has said minimum value have a negative profile offset.

2. A door closer according to claim 1 wherein said profile offset of said pinion teeth reduces from said positive value to a negative value when said lever arm has said maximum value.

3. A door closer according to claim 1, wherein said pinion is directly connected to said closer axle.

4. A door closer in accordance with claim 3, wherein the modulus of said pinion teeth and of said rack teeth vary in inverse proportion to the effective lever arm.

5. A door closer according to claim 1, wherein said pinion meshes with a further pinion and said further pinion is directly connected to said closer axle.

6. A door closer in accordance with claim 1, wherein the modulus of said pinion teeth and of said rack teeth change along the respective pitch curves from a minimum value for pinion and rack teeth which engage when said lever arm is at a maximum value to a maximum value for pinion and rack teeth which engage when said lever arm is at a minimum value.

7. A door closer in accordance with claim 6, wherein each of said pinion teeth has a pressure side flank and a non-pressure side flank and each of said rack teeth also has a pressure side flank and a non-pressure side flank; wherein each flank of each tooth has a respective flank angle; and wherein pressure side flanks of pinion teeth and rack teeth which mesh with one another at small angles of door opening have a more acute flank angle than the non-pressure side flanks of the same teeth.

8. A door closer in accordance with claim 7 wherein said pinion gear is directly connected to said closer axle.

9. A door closer in accordance with claim 7 wherein said second pitch curve is generally S-shaped.

10. A door closer in accordance with claim 7 wherein said first pitch curve comprises first, second and third circular portions which merge directly into one another, with each said circular portion having a different respective radius and a different respective origin with said origins of said circular portions being displaced relative to one another; wherein said first pitch curve portion is associated with a largest angle of opening of the door closer, has a first radius and is followed by said second pitch curve portion which has a second radius substantially greater than said first radius and which continues said first pitch curve portion; and wherein said third pitch curve portion adjoins and continues said second pitch curve portion, is associated with smaller opening angles of said door closer and has a third radius which is smaller than the radius of said first pitch curve portion.

11. A door closer in accordance with claim 7 wherein a hollow cavity is formed in said second end of said piston and is bounded by wall means of said piston; wherein said toothed rack is formed on said wall means; and wherein said eccentric toothed pinion is disposed in said hollow cavity and is directly coupled to said closer axle.

12. A door closer in accordance with claim 7 wherein the closer is constructed as a slide arm closer.

13. A door closer comprising a housing; a bore in said housing; a piston guided in said bore for linear movement therein; spring means disposed in said bore for resiliently biasing said piston into an end position, said piston having first and second opposite ends with said first end coacting with said spring means; a closer axle; an eccentric toothed pinion disposed in said housing and drivingly connected to said closer axle; said eccentric toothed pinion having a first pitch curve and a plurality of pinion teeth disposed along said first pitch curve; a toothed rack formed on said piston between said first and second opposite ends and meshing with said eccentric toothed pinion, said toothed rack having a second pitch curve matched to said first pitch curve and having a plurality of rack teeth disposed along said second pitch curve; wherein said eccentric toothed pinion and said toothed rack cooperate to provide a lever arm of variable length, said lever arm having a maximum value in a first relative position of said eccentric toothed pinion and said toothed rack corresponding to a door closed position and reducing from said maximum value to a minimum value in a second relative position of said eccentric toothed pinion and said toothed rack corresponding to a door open position, wherein the modulus of said pinion teeth and of said rack teeth change along the respective pitch curves from a minimum value for pinion and rack teeth which engage when said lever arm is at a maximum value to a maximum value for pinion and rack teeth which engage when said lever arm is at a minimum value.

14. A door closer according to claim 13, wherein said pinion is directly connected to said closer axle.

15. A door closer according to claim 13, wherein said pinion meshes with a further pinion and said further pinion is directly connected to said closer axle.

16. A door closer comprising a housing; a bore in said housing; a piston guided in said bore for linear movement therein; spring means disposed in said bore for resiliently biasing said piston into an end position, said piston having first and second opposite ends with said first end coacting with said spring means; a closer axle; an eccentric toothed pinion disposed in said housing and drivingly connected to said closer axle; said eccentric toothed pinion having a first pitch curve and a plurality of pinion teeth disposed along said first pitch curve; a toothed rack formed on said piston between said first and second opposite ends and meshing with said eccentric toothed pinion, said toothed rack having a second pitch curve matched to said first pitch curve and having a plurality of rack teeth disposed along said second pitch curve; wherein said eccentric toothed pinion and said toothed rack cooperate to provide a lever arm of variable length, said lever arm having a maximum value in a first relative position of said eccentric toothed pinion and said toothed rack corresponding to a door closed position and reducing from said maximum value to a mimimum value in a second relative position of said eccentric toothed pinion and said toothed rack corresponding to a door open position; wherein each of said pinion teeth has a pressure side flank and a non-pressure side flank and each of said rack teeth also has a pressure side flank and a non-pressure side flank; wherein each flank of each tooth has a respective flank angle; and wherein pressure side flanks of pinion teeth and rack teeth which mesh with one another at small angles of door opening have a more acute flank angle than the non-pressure side flanks of the same teeth.

* * * * *